3,822,197
**DEVICE FOR EXTRACTING ELECTROPHORET-
ICALLY SEPARATED SUBSTANCES**
Stephan Hubertus Anton Nees, Bochum, and Wilhelm
 Schmidt, Marburg, Germany, assignors to Colora
 Messtechnik GmbH, Lorch, West Germany
Filed Sept. 6, 1972, Ser. No. 286,767
Claims priority, application Germany, Sept. 6, 1971,
P 21 44 483.7
Int. Cl. B01k 5/00
U.S. Cl. 204—299                              21 Claims

ABSTRACT OF THE DISCLOSURE

A process and device for carrying out the extraction of electrophoretically separated substances by means of a flowing extraction liquid which comprises a substantially perpendicular separating chamber having a substantially elongated rectangular cross section, an extraction chamber comprising a plate having an opening, the longitudinal and transverse measurements of said extraction chamber corresponding substantially to the inside measurements of the cross section of said separating chamber, the front sides of said separating chamber having a continuous channel for the feeding in and discharge of said extraction liquid toward and away from said extraction chamber, said channels meeting said plate perpendicularly and conduit means in said chamber for the feeding in and discharge of the extraction liquid.

---

The invention relates to a process and a device for extracting electrophoretically separated substances by means of a flowing extraction liquid.

In the case of known devices for electrophoresis, the extraction of the separated substances is accomplished at the end (viewed in the direction of migration of the substances in the electric field) of a separating chamber in such a way that a suitable buffer liquid washes this end of the separating chamber. At the same time the buffer liquid washes the incoming electrophoretically separated substances, such as ampholytes, out of the supporting material in the separating chamber, preferably in the form of a gel. The buffer liquid which then contains the substances is collected and is further processed for analytical or preparatory purposes. The problems which occur in the case of an extraction are seen in the fact that the separated ampholytes must be washed out completely in order to obtain as large a yield as possible and that the extraction must be accomplished quickly in order to be able to separate closely consecutive bands. Also, the quantity of the extracting liquid used must be as small as possible so that the concentration of the extracted substances is not decreased too much or diluted too much. Highly molecular ampholytes are often unusable because they are unstable when diluted too much.

These problems entail specific requirements in order to have a good extraction since the carrying out of which requires technical measures which are directly in contradiction with one another. Thus, according to the status of the prior art, a quick and complete extraction can be realized only by a relatively powerful stream of the extracting liquid. This however means that for the extraction there must be used a relatively large quantity of extraction liquid, so that the concentration of the extract will be decreased to the same measure. Thus a solution of the described problem did not seem to be realizable.

Starting with this situation the invention is based on the objective of increasing the effectiveness of the extraction while decreasing the required quantity of extraction liquid and to a process that can be executed easily. It is a further object of this invention to provide a simple and inexpensive apparatus for the execution of the process.

According to the invention this object is achieved by use of an intermittent extraction stream in the extraction system. For this purpose and according to the invention, gas bubbles move along with the liquid and are deposited in the flowing extraction liquid. This extraction process is realized on the one hand by increasing the effectiveness of the extraction by an intermittent extraction stream and on the other hand the quantity of the extraction liquid thus being decreased at the same time. Practice confirmed this realization in a convincing manner and showed that the concentration of the separated components of an ampholyte mixture in the extract can be increased up to a factor of 40, as compared to the starting volume prior to separation—in the case of the theoretically possible separating capacity of the pertinent gel system. Compared with known extraction processes, this means an increase by about a factor of 20. Such an increase in concentration is considerable, since the expenditure after after-treating processes can be reduced considerably for the concentration of the extracted substances and will be superfluous in many instances. Thus, extraction of sensitive substances (substances which, for example, because of their price or their rare occurrence, are available only in small quantities) becomes possible.

For the possibility of reproducing electrophoreses with extraction, it is important that the convected gas bubbles deposited in the extraction liquid succeed each other at regular intervals as part of the invention. Since normal electrophoreses are carried out in an atmosphere of air, i.e., the substances that are to be separated are not specifically air sensitive, in the case of the invention air is used effectively as a gas for the gas bubbles. Naturally the advantages of the process can also be realized with other gases, especially nitrogen, whenever because of the sensitivity to air of the substances the use of a certain gas for the extraction is to be recommended (for example, in the separation of enzymes from anaerobes).

To carry out the new extraction process, an electrophoresis device with an essentially perpendicular separating chamber, with essentially rectangular, preferably elongated rectangular cross section, and with an extraction chamber added at the end or which can be added at the end (viewed in the direction of migration of the electrophoretically separated substances) with connections for the supply and discharge of the extraction liquid is used.

With such a device, which for example has been described in detail in the German patent applications P 20 56 127.7, P 20 56 128.8 and P 20 56 129.9 of the same inventors, the process can be carried out in a particularly simple and effective manner. This possibility of successful execution of the process by the way proves the superiority of the devices according to the above mentioned German patent applications, as compared to known devices, especially devices with nonrectangular (for example round) cross sections of the separating chamber.

According to the invention the extraction chamber consists of a thin plate having a channel or slit (which is closed preferably by means of a diaphragm on the side opposite the separating chamber) corresponding to the inside width of the end of the separating chamber, whereby the lateral ends of the slit are in direct or indirect connection with a channel provided in each lateral side of the separating chamber and are provided for the supply or discharge of the extraction liquid.

In the case of such a device care must be taken because of the thin plate that substantially all of the flowing extracting liquid comes into contact with the substances that are to be etxracted and the quantity of liquid in this manner is kept very small. Besides, the plate can be very thin because no lateral connections for the supply or discharge of the liquids need be available, since the supply is accomplished through perpendicular channels, existing in the lateral sides of the separating chamber, meeting the upper side of the plate or the slit in the plate, whereby the extraction stream can be guided also by means of corresponding profiles into the slit.

Therefore, in the case of such a device, the extraction stream flowing through the perpendicular channels in the lateral sides of the separating chamber is diverted in the area of the plate in the extraction chamber, so that it will move past the underside of said separating chamber. This diversion is difficult in the case of use of the process according to the invention. Normally the air bubbles must be deformed at the point of diversion and at the same time, in the case of the supply into the extraction chamber, must be transported further in spite of their buoyancy. For this purpose the extracting liquid would have to be put under an undesirably heavy pressure. Therefore, a further embodiment of this invention is based on the object of providing means that will permit the carrying out of the process according to the invention by way of an electrophoresis device without any necessity for an undesirably heavy extraction liquid pressure, and without negative influences, such as irregularity of the current, unevenness of the extraction, sticking of the gas bubbles at the places of diversion, etc., becoming effective. Within the scope of the invention, this object is achieved through the fact that a constriction of the cross section in the area of the diversion is provided for increasing the speed of flow of the extraction liquid. It has been found that in the case of an increased velocity it is easier to divert the gas bubbles. A particularly favorable effect can be achieved if a slanting plane in the liquid conduit is provided at the place of diversion, which rises in the direction of flow and which constitutes at least a part of the upper side of the conduit. Based on the buoyancy of the gas bubbles, a force is effective at the slanting plane in the direction of flow which facilitates a diversion without causing further problems and conveyance of the gas bubbles at the place of diversion.

The minimum size of the gas bubbles that is required depends on the size or cross section of the channel or slit for the extracting liquid in the extracting chamber. A sufficient size can easily be established by means of an experiment: the gas bubbles must migrate with the buffer stream of the extraction, i.e., they must fill at least the entire cross section of the channel. Larger gas bubbles are selected especially when optimum concentrations are to be achieved.

In order to produce an as equal as possible extraction stream, it is preferable to use in the entire extraction system but at least, viewed in the direction of flow, up to the end of the contraction chamber, conduits of about the same cross section. In the case of transparent materials for the conduits, the migration of the gas bubbles in the system then can easily be observed and it will be easy to determine and correct the velocity of flow as well as the length of the bubbles.

The introduction of the gas bubbles into the actual extraction space of the extraction chamber can additionally be improved by the fact that the width of the opening or slit of the extraction chamber is also decreased in the area at the place of diversion. Thus, air bubbles arriving from the narrow feed lumen at the place of diversion pass into an enlarging lumen with a smaller resistance. This contributes to the increase in the velocity of the bubbles.

Within the scope of the invention a slanting plane also is provided in the area of the place of diversion of the stream of liquid from the extraction chamber into the perpendicular channels in one lateral side of the separating chamber. The slanting plane runs rising in the direction of flow and is on the upper side of the conduit, so that the gas bubbles glide along it and easily pass on the basis of their buoyancy from the area at the place of diversion.

The deposition of the gas bubbles into the extraction liquid should be possible simply and each time at the desired size and frequency. Within the scope of the invention this object is achieved in the case of a device for carrying out the process by means of an interchanging feed of definite quantities of extraction liquid and gas. These means can be developed in different manners. They comprise generally a pressure producer and a timer. In the most simple case, the tank for the extracting liquid is placed up high compared to the electrophoresis device and serves as a pressure producer, so that liquid flows through the system on the basis of static pressure. The timer preferably consists of a synchronous electric motor with a cam disk. In the above mentioned case, the timer merely has to lift the connecting conduit of the system from time to time out of the level of the liquid in the tank for the extracting liquid in order to move the desired gas bubbles into the system. However, for industrial purposes, it is more advantageous to convey the extracting liquid into the extracting system by means of a pump. In this case the suction line is connected, possibly by means of a T-iron, on the one hand with the extracting liquid and on the other hand with the gas which is to be sucked in, whereby the timer opens from time to time a valve in the suction line for the gas for sucking in the gas bubbles. The valve can be developed as a magnetic valve and can be switched by means of a switch controlled by the cam disk. The cam disk however, can also act directly or by way of an arrangement on the suction line developed as an elastic hose or squeeze valve.

As a still further embodiment of the invention, two pumps may be used for the production of gas bubbles, one of which serves for sucking in the extracting liquid and the other for sucking in the gas. In this case the timer controls an electric reversing switch for the alternate operation of the pumps, the connections of which on the pressure side are connected by way of a T-iron and a common line with the extracting system for the purpose of feeding said system. Preferably, so-called peristaltic pumps are used as pumps because this type is available anyway in a laboratory in which electrophoretic operations are conducted and which moreover assuredly prevents a reflux through a pump which in each case is put out of operation.

Other objects and advantages of this invention will become clear when viewed with the accompanying drawings, wherein.

Figure 1:
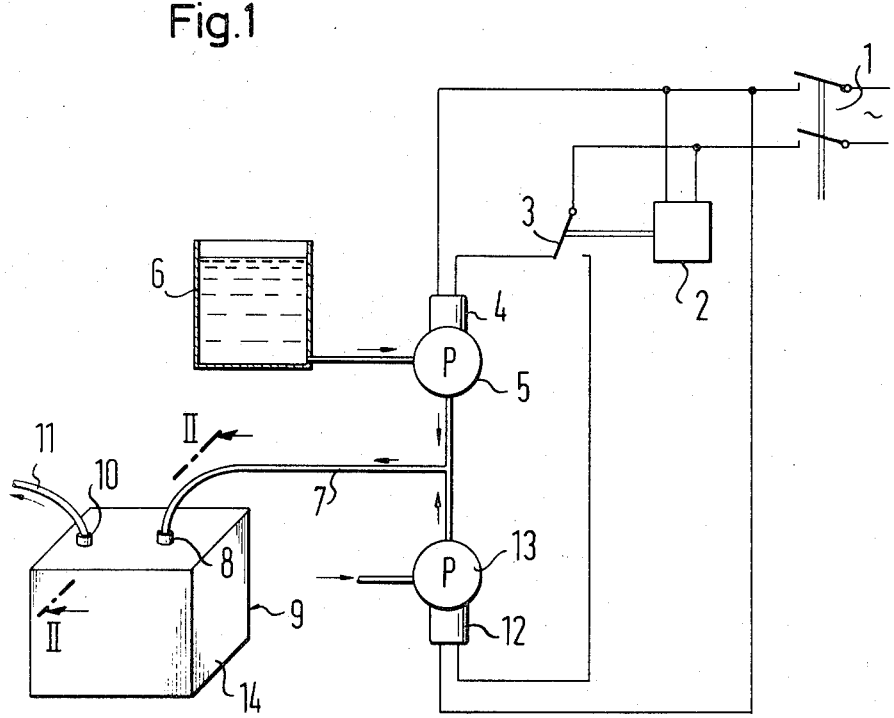
FIG. 1 shows an overall block diagram of this invention.

In FIG. 1 the reference numeral 1 designates a double pole main switch, in the case of operation of which voltage is applied to the timer 2. Timer 2 preferably consists of a synchronous motor with cam disk which operates the reversing switch 3. In the position shown with switch 1 turned on, the motor 4 of pump 5 is connected to a voltage. This pump 5 conveys the extraction liquid from the extraction liquid tank 6 according to the directions of the arrows via a T-iron and the line 7 to connection 8 on the electrophoresis device 9, from which the extraction liquid again emerges at connection 10 and is fed, for example, to a sample collector via the pipe 11.

Upon reversal of reversing switch 3 in dependence on the timer 2 controlling reversing switch 3, the electric motor 4 of pump 5 carries no current and, instead, the electric motor 12 of the pump 13 is connected to current. This pump 13 again in the direction of the arrow conveys gas to the connecting hose 7 as long as switch 3 is in the position which has not been drawn. In the manner, according to the setting of the timer, varying quantities of gas are deposited in the extracting liquid flowing from tank 6. In addition, the cams of the disks are adjustable.

Figure 2:
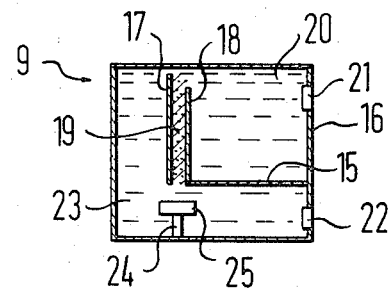
FIG. 2 shows schematically a cut through the elecrophoresis device according to FIG. 1 and following line II—II.

FIG. 2 shows a cut following line II—II through the electrophoresis device. For the sake of clarity, only those parts which are most essential for the understanding of the device are indicated. The inside space of the cube-shaped housing of device 9 is subdivided by an intermediate bottom 15 that extends horizontally forward from the rear wall 16 across two-thirds of the depth of the housing. The plates 17 and 18 are disposed parallel to one another and plate 18 rises perpendicularly from the free end of bottom 15. Plate 17 is somewhat higher than plate 18. These two plates 17 and 18 constitute the front and rear sides of the separating chamber filled with gel 19. As shown in FIG. 2, bottom 15 together with plate 18 constitutes a closed space in which the buffer liquid (indicated in dotted lines) and connected with the upper side of the gel in the separating chamber is located. On the rear side 16 of the housing, one electrode 21 is housed in the area of the buffer liquid 20 and the other electrode 22 is housed in the area of the remaining space 23 at the rear wall 16. The remaining space 23 of the housing likewise is filled with a buffer liquid constituting the electric connection between electrode 22 and the underside of the gel in the separating chamber. The buffer liquids in spaces 20 and 23, contrary to the indication by the dashed line in FIG.2, do not reach the upper end of plate 17. A so-called extraction chamber 25 can be added by means of a lifting device 24 to the underside of the separating chamber.

Figure 3:
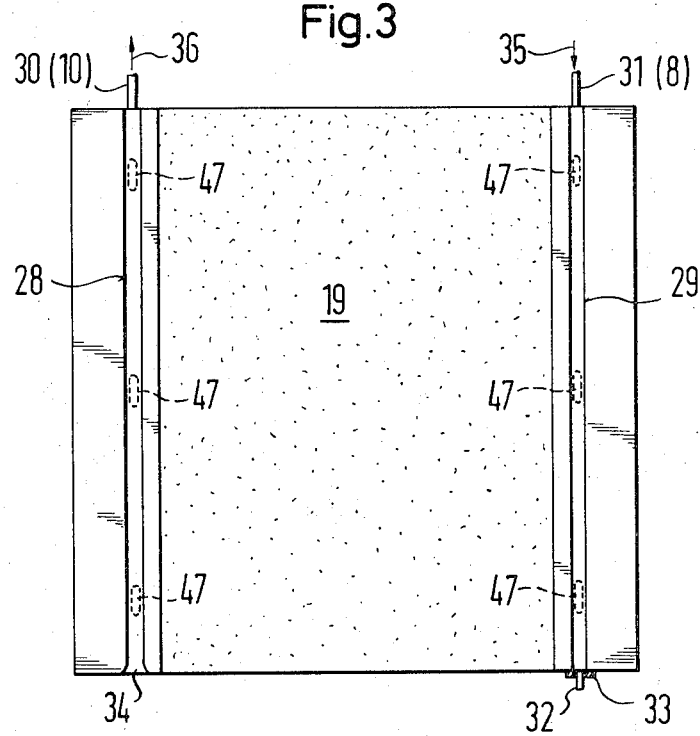
FIG. 3 shows the separating chamber of the device in a longitudinal section at an enlarged scale.
Figure 4:
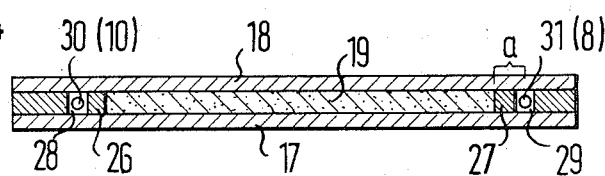
FIG. 4 shows a cross section through the separating chamber according to FIG. 3.

FIG. 3 shows a longitudinal cut through the separating chamber and FIG. 4 shows a corresponding cross section. Reference number 19 again designates the gel and 17 and 18 the front and rear plate of the separating chamber. The connections for the feed and discharge conduits of the extracting liquid are designated as in FIG. 1 by 8 and 10. As becomes most clear from FIG. 4, the side bars 26 and 27 laterally delimiting the gel 19 contain channels 28 and 29, into which fitting silicon hoses 30 and 31 have been drawn. The silicon hose 31 projects at point 32 (i.e., the lower end of the separating chamber) somewhat from the lower limitation and has been sealed by means of a washer 33. At the lower end of channel 28, the inserted hose 30 has not been guided quite up to the underside; rather, channel 28 is provided with an enlargement or expansion which opens downwards. The enlargement constitutes a slanting plane and has been assigned the reference number 34. Arrows 35 and 36 indicate that the extraction liquid together with the deposited gas bubbles is fed in at 8 and that it is discharged again in the direction of arrow 36 at 10.

Figure 5:
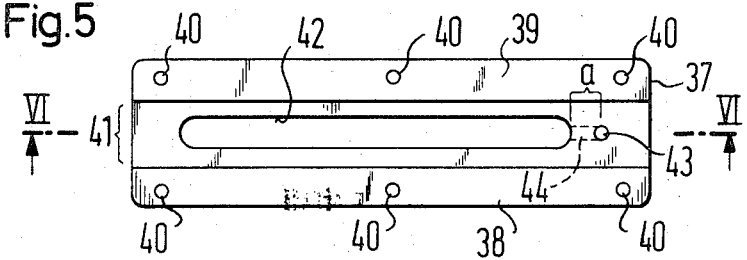
FIG. 5 shows the extraction chamber in top view which is to be added to the underside of the separating chamber and FIG. 6 shows a cut through the extraction chamber according to FIG. 5 following line VI–VI.

In FIG. 5 a so-called extracting chamber plate 37 (designated by 25 in FIG. 2) is shown. This plate is essentially elongated and rectangular and has attaching means 40 at its longitudinal edges 38 and 39 for its arrangement on the lifting device 24, which presses the extraction chamber plate against the underside of the separating chamber. In its middle section 41 the plate is provided with a longitudinal slit 42, which in its dimensions correspond to the inside width of the gel underside in the separating chamber. On its underside the extraction chamber is closed by a diaphragm (not shown). The small hose 31 projecting in FIG. 3 at point 32 further projects in the pressed-on state of the extraction chamber to the separating chamber into bore 43 in plate 37. This bore 43 penetrates the entire extracting plate and thus is closed at its underside by means of the diaphragm Bore 43 lies at a lateral distance from the beginning of slit 42 (this distance is shown in FIG. 4 and is designated by $a$). The connection 44 between bore 43 and slit 42 is developed in the way shown in FIGS. 5 and 6. It is somewhat narrower than the width of slit 42 and, in addition, a wedge 45 is in the area of distance $a$ on the upper side of this connecting element, the broad front side 46 of which is constituted by a part of the wall of bore 43. The wedge is so developed and disposed that at the beginning of slit 42 the thickness of the connecting hose corresponds to that of the extraction chamber plate. The surface of the slanting plane is smoothly polished.

Figure 6:
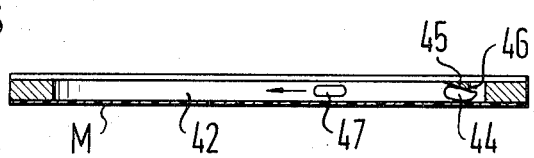

The gas bubbles deposited in the extraction liquid are designated by 47 in FIG. 3. In addition it is indicated in FIG. 6 how the movement of the gas bubbles takes place in the area of the slanting plane (wedge 45) between the separating chamber and the extraction chamber.

The extraction system comprises the parts of the conduit system and details which in the description have the following reference numbers (arranged in the direction of flow) 7, 8, 31, 32, 43–46, 42, 34, 28, 30, 10, 11.

Obviously, the embodiments shown are exemplary only and a wide variety of embodiments may be devised without departing from the spirit and scope thereof.

What is claimed is:

1. Device for carrying out the extraction of electrophoretically separated substances by means of a flowing extraction liquid which comprises a substantially perpendicular separating chamber having a substantially elongated rectangular cross section, an extraction chamber located below said separating chamber comprising a plate having an opening, the longitudinal and transverse measurements of said extraction chamber corresponding substantially to the inside measurements of the cross section of said separating chamber, and conduit means in said extraction chamber for the feeding and discharge of the extraction liquid, and means for producing an intermittent stream of said extraction liquid.

2. The device according to claim 1, including means for the diversion of the extraction stream into said opening of said plate.

3. The device according to claim 2, wherein at the area of the means for the diversion a constriction of the cross section is provided in order to increase the flow velocity of the extraction liquid.

4. The device according to claim 3, wherein said constriction of the cross section is achieved by a slanting plane located in a conduit means between the meeting with said plate and the opening of the plate, which plane constitutes at least a part of the upper side of the conduit means and which rises in the direction of flow toward the opening in said plate.

5. The device according to claim 4, wherein said conduit has a width which is less than the width of the opening of the plate.

6. The device according to claim 4, further comprising a front side of a wedge which comprises a slanting plane extending from the upper side of the plate to close its underside and comprises the wall of an aperture forming the extension of the corresponding channel of the separating chamber in the plate.

7. The device according to claim 4, wherein the surface of said slanting plane is smooth.

8. The device according to claim 1, wherein said opening is dimensioned so that a volume of gas bubbles fills at least the entire cross section of the conduit means located there during the migration of said gas bubbles in the extraction area under the separation chamber.

9. The device according to claim 4, wherein said conduit means are of transparent material.

10. The device according to claim 1, including a slanting plane for the discharge of the extraction liquid from the extraction chamber in the area where said channel empties.

11. The device according to claim 1, including means for the alternate feeding of definite quantities of extraction liquid and gas into the extraction system.

12. The device according to claim 11, wherein said means comprises pump means and timer means.

13. The device according to claim 12, wherein said timer means consists of a synchronous electric motor having a cam disc.

14. The device according to claim 13, wherein said pump means includes a suction line from the level of the extraction liquid that is to be sucked in, said cam disc intermittently lifting said suction line.

15. The device according to claim 12, further comprising a valve pump means includes a suction which is connected directly on the one hand with the extraction liquid that is to be sucked in and on the other hand by way of said valve with the gas that is to be sucked in, and said timer adapted to open the valve from time to time for sucking in gas bubbles.

16. The device according to claim 15, wherein said valve is a squeeze valve operable by the cam disc of said timer.

17. The device according to claim 16, wherein said pump means comprises two pumps driven by electric motor means, one of said pumps being for sucking in extraction liquid and the other of said pumps being for sucking in gas, and including a reversing switch controlled by said timer means for the alternate operation of said pumps, the connections of said pumps on the pressure side being connected with the extraction chamber by way of a common conduit.

18. The device according to claim 17, wherein said pumps are peristaltic pumps.

19. The device according to claim 1, wherein said opening is closed by means of a diaphragm on the side opposite the separating chamber.

20. The device according to claim 1 wherein the front sides of said separating chamber have continuous channels for the feeding in and discharge of said extraction liquid toward and away from said extraction chamber, said channels meeting said plate perpendicularly.

21. The device according to claim 1 wherein said means deposits gas bubbles in the extraction liquid.

References Cited
UNITED STATES PATENTS

| | | | |
|---|---|---|---|
| 3,470,080 | 9/1969 | Raymond et al. | 204—180 G |
| 3,563,880 | 2/1971 | Anderson | 204—299 |
| 3,718,559 | 2/1973 | Wallace | 204—180 G |

JOHN H. MACK, Primary Examiner

A. C. PRESCOTT, Assistant Examiner

U.S. Cl. X.R.

204—180 R, 180 G